(12) United States Patent
Alshahrani et al.

(10) Patent No.: US 12,529,689 B2
(45) Date of Patent: Jan. 20, 2026

(54) ON-SITE SOIL POROSITY MEASUREMENT METHODOLOGY AND APPARATUS

(71) Applicant: Saudi Arabian Oil Company, Dhahran (SA)

(72) Inventors: Mohammed Alshahrani, Dammam (SA); Layan AlSharif, Dhahran (SA); Naim Dakwar, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 286 days.

(21) Appl. No.: 18/489,342

(22) Filed: Oct. 18, 2023

(65) Prior Publication Data
US 2025/0130218 A1    Apr. 24, 2025

(51) Int. Cl.
| | | |
|---|---|---|
| *G01N 33/24* | (2006.01) | |
| *G01N 1/44* | (2006.01) | |
| *G01N 5/04* | (2006.01) | |
| *G01N 15/00* | (2024.01) | |
| *G01N 15/08* | (2006.01) | |
| *G01N 19/10* | (2006.01) | |

(52) U.S. Cl.
CPC ............ *G01N 33/246* (2013.01); *G01N 1/44* (2013.01); *G01N 5/045* (2013.01); *G01N 15/0893* (2013.01); *G01N 19/10* (2013.01); *G01N 2015/0034* (2013.01)

(58) Field of Classification Search
CPC ....... G01N 15/0893; G01N 2015/0034; G01N 5/025; G01N 5/045; G01N 33/246; G01N 33/245; G01N 1/44
See application file for complete search history.

(56) References Cited

U.S. PATENT DOCUMENTS

| | | | |
|---|---|---|---|
| 5,888,021 A | * | 3/1999 | Kawabata ................. B09C 1/08 435/262.5 |
| 6,615,643 B2 | | 9/2003 | James et al. |
| 6,817,230 B2 | | 11/2004 | James et al. |
| 10,371,814 B2 | | 8/2019 | Chan et al. |

(Continued)

OTHER PUBLICATIONS

Spasic, Marko et al. "Determination of physical properties of undisturbed soil samples according to V. Novak" MethodsX 10 (2023) 102133, Mar. 12, 2023. (Year: 2023).*

(Continued)

*Primary Examiner* — Paul M. West
(74) *Attorney, Agent, or Firm* — Fish & Richardson P.C.

(57) ABSTRACT

A computer-assisted method to monitor soil porosity at a field study site using a portable apparatus, the method including: acquiring a soil sample using a first container; recording a first measurement of a mass and a volume of the soil sample; adding the soil sample to a second container until the soil sample is added in entirety, wherein the second container is pre-filled with a fluid medium, wherein the soil sample is added to the second container without causing soil clustering, and wherein a second measurement of a mass of the second container with the fluid medium is recorded; recording a third measurement of a mass of the second container with the soil sample fully immersed in the fluid medium; calculating a porosity of the soil sample based on the first, second, and third measurements; and providing, at the field study site, the calculated porosity of the soil sample.

20 Claims, 4 Drawing Sheets

(56) References Cited

U.S. PATENT DOCUMENTS

| | | | |
|---|---|---|---|
| 10,512,212 B2 | 12/2019 | Koch et al. | |
| 11,946,845 B1* | 4/2024 | Yang | G01N 15/088 |
| 2020/0393382 A1* | 12/2020 | van den Haak | A01C 21/002 |

OTHER PUBLICATIONS

Moret-Fernandez et al. "Determination of Soil Aggregate Porosity Using the Modified Water Saturation Method" Pedosphere 29 (6):794-800 (2019). (Year: 2019).*

"Soil Sampling and Methods of Analysis," 2nd ed., Carter, M.R. and Gregorich, E.G. (ed)., Chapter 57, 743-759, 17 pages.

Img.antpedia.com, [online], "ASTM, D854-14, Standard Test Methods for Specific Gravity Of Soil Solids By Water Pycnometer," May 2014, retrieved on Apr. 26, 2024, retrieved from URL<https://img.antpedia.com/standard/files/pdfs_ora/20221211/astm/ASTM%20D854-14.pdf>, 3 pages.

Mouazen et al., "Comparison among principal components, partial least squares and back propagation neural network analyses for accuracy of measurement of selected soil properties with visible and near infrared spectroscopy," Geoderma, Aug. 2010, 158(1-2):23-31, 9 pages.

Ochsner et al., "Simultaneous water content, air-filled porosity, and bulk density measurements with thermo-time domain reflectometry," Soil Science Society of America Journal, Nov. 2001, 65(6):1618-1622, 5 pages.

Pedrotti et al., "Evaluation of bulk density of Albaqualf soil under different tillage systems using the volumetric ring and computerized tomography methods," Soil and Tillage Research, Jan. 2005, 80(1-2):115-123, 9 pages.

* cited by examiner

ON-SITE SOIL POROSITY MEASUREMENT METHODOLOGY AND APPARATUS

TECHNICAL FIELD

This disclosure generally relates to soil property characterization.

BACKGROUND

Soil characterization, including the assessment of properties like porosity, refers to the process of studying and understanding the Earth's subsurface for various purposes, such as mineral exploration, geotechnical engineering, environmental assessments, and more. Porosity generally refers to the percentage of void space within a soil or rock sample relative to its total volume. In oil and gas exploration, for example, porosity is a parameter that plays a significant role for estimating the amount of hydrocarbons that a reservoir can hold. In this context, porosity also helps determine the permeability of the rock, which affects the flow of oil and gas within the reservoir.

SUMMARY

In one aspect, the implementations provide a computer-assisted method to monitor soil porosity at a field study site using a portable apparatus, the method including: acquiring, at the field study site, a soil sample using a first container of the portable apparatus; automatically recording a first measurement of a mass and a volume of the soil sample acquired by the first container; gradually adding the soil sample to a second container that is larger than the first container in volume until the soil sample is added in entirety, wherein the second container is pre-filled with a fluid medium to a pre-determined level, wherein the soil sample is added to the second container without causing soil clustering, and wherein a second measurement of a mass of the second container with the fluid medium pre-filled to the pre-determined level is automatically recorded; automatically recording a third measurement of a mass of the second container with the soil sample fully immersed in the fluid medium; automatically calculating a porosity of the soil sample based on the first measurement, the second measurement, and the third measurement; and automatically providing, on a display of the portable apparatus and at the field study site, the calculated porosity of the soil sample.

Implementations may include one or more of the following features.

The method may further include: drying, using a microwave, the soil sample inside the first container until the soil sample reaches a pre-defined dryness level; and monitoring, using a build-in moisture sensor on the portable apparatus, a moisture level of the soil sample inside the first container. The method may further include: comparing the moisture level of the soil sample inside the first container with the pre-defined dryness level; and responsive to the moisture level of the soil sample reaching the pre-defined dryness level, stopping the microwave. The method may further include: sieving the soil sample through a mesh with a pre-determined mesh size. The pre-determined mesh size may comply with an industry standard for laboratory testing. The pre-defined dryness level may be provided by a user on an interactive user interface. The first measurement of the mass of the soil sample acquired by the first container may be performed using a digital scale. The third measurement of the mass of the second container with the soil sample fully immersed in the fluid medium may be performed using a digital scale. The porosity may be calculated using a microprocessor configured to receive the first measurement, the second measurement, and the third measurement. The calculated porosity may be provided on a recurring basis at the field study site using the portable apparatus such that soil porosity at the field study site can be monitored according to the recurring basis.

In another aspect, the implementations provide a portable apparatus for monitoring soil porosity at a field study site, the portable apparatus including: a first container sized and shaped to acquire, at the field study site, a soil sample; a second container sized to have a volume larger than the first container and operable to be pre-filled with a fluid medium to a pre-determined level such that the soil sample can be gradually added to the second container without causing soil clustering; a digital recording device coupled to the first and second containers and configured to automatically record a first measurement of a mass and a volume of the soil sample, a second measurement of a mass of the second container with the fluid medium pre-filled to the pre-determined level, and a third measurement of a mass of the second container with the soil sample fully immersed in the fluid medium; a control logic coupled to the digital recording device, wherein the control logic is configured to perform operations of: receiving recordings from the digital recording device; automatically calculating a porosity of the soil sample based on the first measurement, the second measurement, and the third measurement; and automatically providing, at the field study site, the porosity of the soil sample; and a display coupled to the control logic and configured to display the calculated porosity of the soil sample.

The implementations may include one or more of the following features.

The portable apparatus may further include: a microwave device compatible with the first container and configured to dry the soil sample inside the first container until the soil sample reaches a pre-defined dryness level; and a build-in moisture sensor operable to be immersed in the soil sample and configured to measure a moisture level of the soil sample inside the first container while the soil sample is being dried. The control logic may be configured to perform additional operations of: comparing the moisture level of the soil sample inside the first container with the pre-defined dryness level; and responsive to the moisture level of the soil sample reaching the pre-defined dryness level, stopping the microwave device. The portable apparatus may further include: a mesh with a pre-determined mesh size such that the soil sample can be sieved. The pre-determined mesh size may comply with an industry standard for laboratory testing. The portable apparatus may further include an interactive user interface configured to allow a user to enter the pre-defined dryness level, and wherein the interactive user interface comprises the display where the porosity is displayed. The digital recording device may include a digital scale configured to perform the first measurement of the mass of the soil sample acquired by the first container. The digital recording device may include a digital scale configured to perform the third measurement of the mass of the second container with the soil sample fully immersed in the fluid medium. The control logic may include a microprocessor configured to receive the first measurement, the second measurement, and the third measurement, and calculate the porosity based on the first measurement, the second measurement, and the third measurement. The portable apparatus may be configured to provide the calculated porosity on a recurring basis at the field study site such that soil porosity at the field study site is monitored according to the recurring basis.

Implementations according to the present disclosure may be realized in computer implemented methods, hardware computing systems, and tangible computer readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

Like reference numbers and designations in the various drawings indicate like elements.

DETAILED DESCRIPTION

Figure 1:
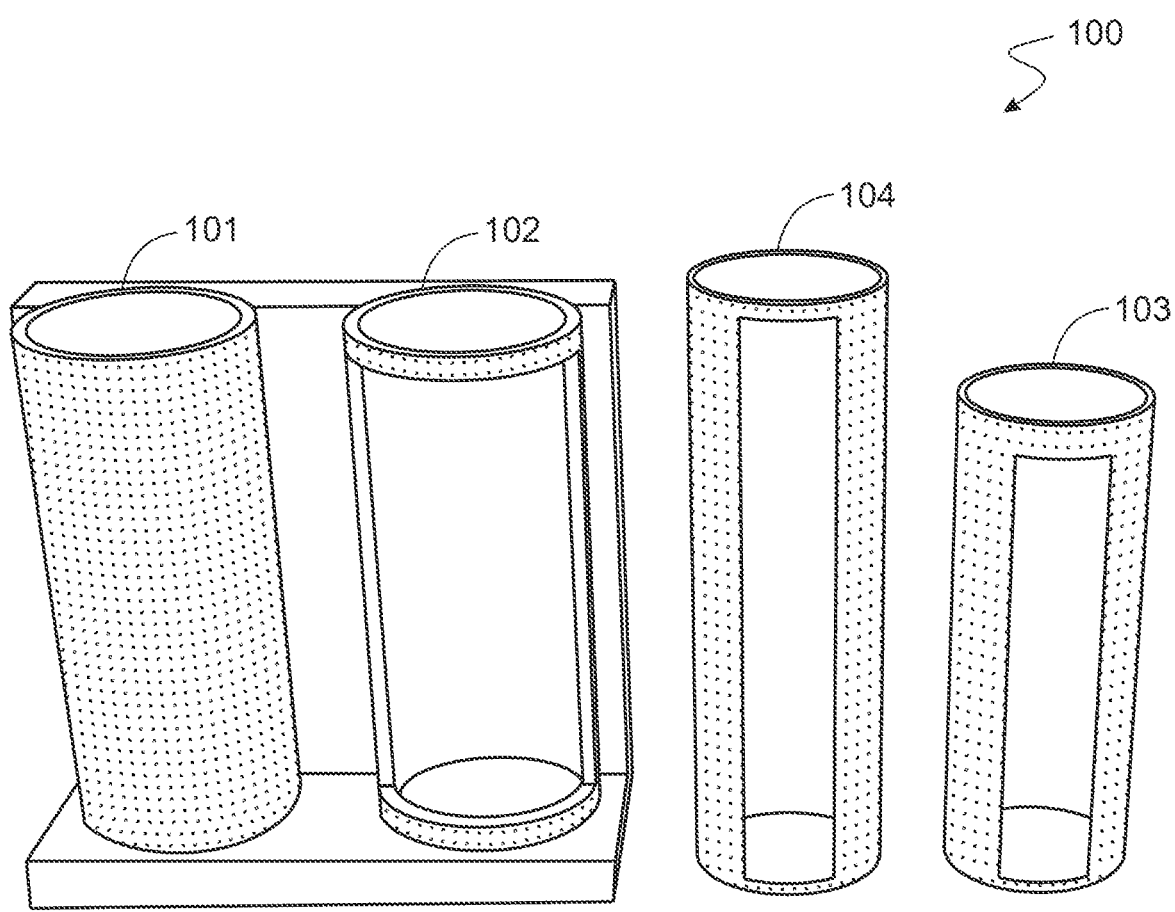
FIG. 1 illustrates an example of a diagram for onsite soil characterization according to some implementations of the present disclosure.

In the context of soil characterization (e.g., during geo-exploration), porosity is a parameter with implications for water resources, mineral exploration, engineering projects, and environmental assessments. Accurate porosity data helps professionals make informed decisions about subsurface properties and behaviors. The disclosure is directed to on-site determination of soil porosity without the need to ship soil specimens to laboratories for porosity measurements. Laboratory tests, such as mercury intrusion porosimetry and water content measurements, can provide porosity values for soil samples but requires shipping samples to a laboratory, which can be time consuming and subject to alterations caused by transportation.

Implementations of the present disclosure, however, provide a portable device with compartments and on-board electronics and control to provide on-site determination of, e.g., minimum soil porosity as a soil property, which could correspond to porosity after years of not disturbing the soil. Minimum porosity generally indicates the maximum possible conduction of ions for corrosion, hence provides an input to drive soil corrosivity. The portable device can include two major portions, namely, a first portion in which the soil sample is heated using, for example, microwave heating to eliminate moisture content in the soil, and a second portion in which the post-heating soil sample is further processed to allow for specific measurements of mass and volume needed for calculating soil porosity directly in accordance with an industry standard and without using neutron tools, Computed Tomography (CT) scanning, or Time Domain Reflectometry (TDR).

The implementations of the present disclosure can obviate the need for collection and shipment of soil specimens to laboratories for porosity measurements, providing immediate, on-site calculations. For example, the implementations can incorporate a method and apparatus for calculating soil properties, for example, using a portable device capable of adapting standardized and hence reproduceable laboratory testing methodologies to in-field operations. An exemplary laboratory testing protocol is ASTM (American Society for Testing and Materials) D854-14, which outlines standardized methods for specific gravity of soil solids by water pycnometer. The implementations may broadly encompass two major categories, namely, a first category where soil is heated using microwave heating to eliminate moisture content in soil, and a second category that measures specific values needed for the device to calculate soil porosity directly. Detailed explanations of these implementations are provided further in the description of FIGS. 1-4 below.

By way of illustration, because soil sample collection can be detrimental to the measured porosity, the purpose of the measurement should be established beforehand. The soil specimen can be collected based on two objectives, namely, to measure the effective porosity in the field or to measure the minimum possible porosity as a soil property. Each has its own merit. Effective porosity can provide an indication of the soil porosity in a specific vicinity, which may not necessarily be indicative of that corresponding soil type as soil is heterogenous. Therefore, if a representative effective porosity is needed, then a representative number of soil specimens need to be tested. To have a representative porosity of the actual condition in field, however, the soil specimen may not be disturbed before the measurement. Here, the parameter with significance to measure in the undisturbed soil is the volume the soil occupies. Therefore, with the use of a cylindrical core sampler of a known volume, the soil specimen can be collected. Here, the sampler needs to be transparent to allow the visual inspection of the soil without disturbance.

In comparison, minimum porosity can reveal a soil property where the soil is compressed to obtain the lowest value of porosity for that soil specimen, which could correspond to porosity after years of not disturbing the soil. In this context, minimum porosity can indicate the maximum possible conduction of ions for corrosion, and hence minimum porosity can provide an input to soil corrosivity. Minimum porosity, as a property of the soil, can be calculated if the sample is as compacted as possible. For this purpose, a cylinder of a known volume can be filled with soil, then compacted using intense vibration of the cylinder and/or applying force for a duration of, for example, 10 minutes on the collected soil specimen. After compaction, more soil can be added to fill the known volume and repeat the above compaction method. The compaction can be repeated until the known volume is filled with compacted soil.

FIG. 1 shows an example of a system 100 according to some implementations of the present disclosure. System 100 includes compartment 101 and compartment 102, each designed for a specific functionality in the process of soil porosity measurement, e.g., minimum porosity and effective porosity. Compartment 101 can be adapted for rapid, uniform drying of the soil sample using, for example, a microwave-based system. In one example, the soil can be placed on a perforated or mesh platform located in the center of the compartment 101 to provide uniform heating (on all sides). The heating chamber may be a cylindrical design lined with a material resistant to microwaves, such as ceramics, for safety and durability. The microwave power and drying time are adjustable to accommodate different soil types and moisture content. A built-in moisture sensor can be integrated to automatically stop the drying process once the soil reaches a predefined dryness level, thereby ensuring consistency across different soil samples. The predefined dryness level corresponds to 0% moisture, which means the soil sample is completely dry. Using a microwave-based system can provide efficiency in drying the soil, which may consume less energy than traditional heating methods.

After drying, the soil sample in compartment 101 can be sieved through a mesh. In some cases, the mesh size can be 4.75 mm that complies with the ASTM D854-14 laboratory standard for soil porosity measurement to potentially eliminate oversized particles. For context, ASTM D854-14 is an example of a laboratory standard test method that describes the procedure for determining the specific gravity of soils by means of a water pycnometer. In this context, a water pycnometer refers to a device used to measure the density or specific gravity of a soil sample. In other cases, a mesh of different size may be used depending on the specific soil type and requirements of the analysis. Once sieved, the soil can be sampled using a tool with a fixed volume ($V_b$). In one case, the sampling tool can be a cylindrical device, such as compartment 101 illustrated in FIG. 1. Notably, other shapes and designs that provide a fixed volume could be used. Sieving may not be done if effective porosity is to be measured. In the case of measuring effective porosity, compartment 101 can be mounted on a digital scale 205 (seen in FIG. 2) for recording a measurement of weight. Since the weight of compartment 101 is known, the weight of the soil sample can be obtained accordingly. Notably, the soil sample is completely dry (i.e., 0% moisture) in order to carry out the pycnometer techniques. Using, for example, the disclosed cylindrical core sampler, the calculated porosity of the soil sample is representative of the effective porosity.

Figure 2:
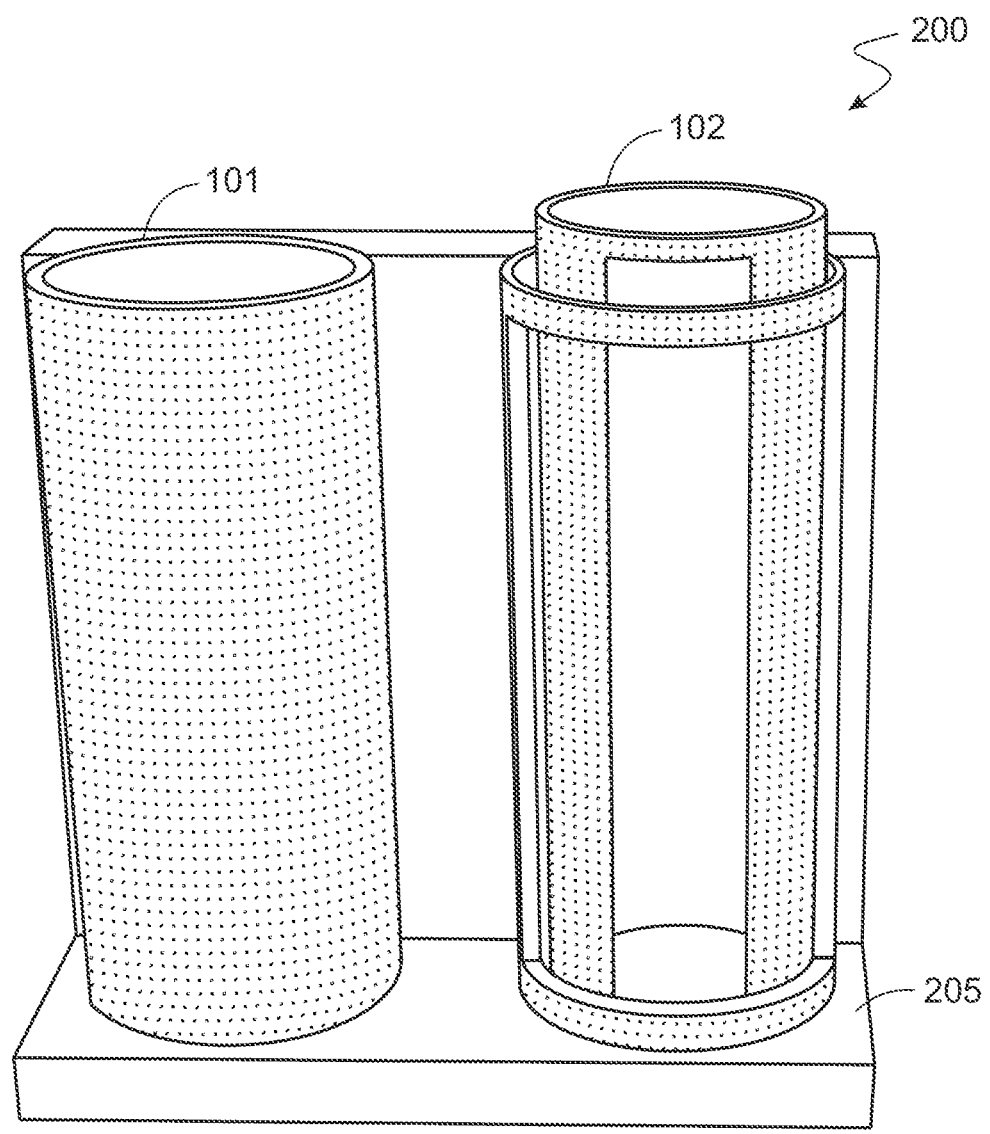
FIG. 2 illustrate additional details of the example of FIG. 1 according to some implementations of the present disclosure.

An illustration is provided in FIG. 1 showing containers 103 and 104, each of known volume and weight, when seeking measurements of both minimum porosity and effective porosity. These containers (e.g., flasks) illustrate the relative sizes of the compartments, where the soil is collected in the small container and then added to the large container with water (a fluid medium) pre-filled to a pre-defined level. In some cases, the soil can be collected in a small container (such as container 103) and gradually added to the water in a large container (such as container 104) without causing soil clustering. Thereafter, the container with the soil sample can be measured using the integrated digital scale 205 on the portable apparatus, as illustrated in FIG. 2.

In more detail, implementations can measure porosity in soil through calculating the soil's water- and air-filled gaps by calculating the bulk density ($D_b$) of the soil and the density of the soil particles ($D_p$). When both densities are calculated, the fraction of voids, i.e., porosity (n), in the tested soil specimen, can be expressed as:

$$n = \left(1 - \frac{D_b}{D_p}\right) \times 100. \quad (1)$$

The bulk density ($D_b$) is the weight of the dry soil ($W_s$) divided by the volume occupied by the soil, which can be expressed as:

$$D_b = \frac{W_s}{V}. \quad (2)$$

The particle density ($D_p$) can be calculated using the pycnometer method, e.g., as provided under the ASTM D854-14 standard. The measurement generally includes dividing the dry weight of the soil ($W_s$) by the weight of the particles in the soil, which is calculated by the weight of water displaced by the particles, as shown below:

$$D_p = \frac{d_w W_s}{W_s - (W_{sw} - W_w)}. \quad (3)$$

$W_{sw}$ is the weight of container, water and soil;
$W_w$ is the weight of container and water; and
$d_w$ is the density of water at the test temperature.

Therefore, the parameters needed to measure the soil porosity include:
the volume that the soil occupies, whether it is dried or in the undisturbed condition;
the weight of the soil specimen; and
the volume of soil particles, which is calculated from the total weight of soil particles and water in a fixed volume.

In various implementations, a known fixed volume can be used in designing the apparatus. Therefore, the two parameters for implementations to determine include the weight of the particles to obtain the particle density and the weight of the soil to calculate the bulk density. These parameters can be measured, as further explained below.

Referring FIG. 1, compartment 102 of system 100 is designed for accurate mass and volume measurements. This compartment 102 can houses a digital precision scale, which can be accurate to the nearest 0.01 grams in some cases. Other degrees of accuracy can also be used. Referring to FIG. 2, the scale may be embedded in a flat platform designed to hold the sampling tool for weighing. The fixed-volume soil sample, as obtained via fixed-volume container 104 and loaded into compartment 102, may then be placed on the scale of compartment 102 and the mass of the soil sample ($W_s$) may be measured. In one example, the mass of the soil sample can be recorded automatically by the device for further calculations.

Once the soil mass $W_s$ has been measured, the soil can added to a new compartment, which is similarly constructed as compartment 102 (e.g., with an integrated digital scale), but can have a volume larger than compartment 102 by, for example, at least 20%. Given the dryness of the soil sample, the soil sample does not stick to the wall of the compartment. A comparison of the size difference is illustrated by containers 103 (smaller) and 104 (larger) in FIG. 1. The water-filled mass is set and fixed in the new compartment. A mark on the 40% volume of the new compartment can be filled by water first, then soil is added slowly to the water until all soil specimen is added. If more water is needed to saturate the soil, more water can be added in a timely manner to allow the continuation of adding soil to water, rather than the other way around. The purpose is to prevent the soil from clustering, which may mislead the porosity calculation. After water addition, the total mass of the water and soil ($W_{SW}$) can also be measured using the embedded scale. The mass of water filled to the same mark can be a predetermined value ($W_W$) and can be recorded in the system for use in the porosity calculation. In some cases, system 100 could be designed to use alternative liquids for soil samples with significant organic content, such as kerosene, which would require additional safety considerations as kerosene is flammable.

In some implementations, the measurements of $W_s$ and $W_{SW}$ can be captured automatically, and an integrated microprocessor is used to calculate the soil porosity (n) using all the above equations to produce the following formula:

$$n = 1 - \frac{D_b}{D_p} = 1 - \frac{\frac{W_s}{V_b}}{\frac{d_w W_s}{W_s - (W_{sw} - W_w)}} = \qquad (4)$$

$$1 - \frac{\frac{1}{V_b}}{\frac{d_w}{W_s - (W_{sw} - W_w)}} = 1 - \frac{W_s - (W_{sw} - W_w)}{d_w V_b},$$

where $d_w$ as the density of water density of water at test temperature (approximately 1 g/cm³). The calculated porosity value is then displayed on an integrated digital display panel for the user.

In one illustrative example, weight of soil sample and volume of soil sample were provided as:
$W_s$=853.3 g
$V_b$=560 ml
Therefore, $$D_b = \frac{853.3}{560} = 1.52.$$

In this illustrative example, density of water and weight of soil and water were measured as:
$d_w$=0.9907
$W_{sw}$=3550 g
$W_w$=3067.9 g
Therefore, $$D_p = \frac{0.9907 \times 853.3}{853.3 - (3550 - 3067.9)} = 2.27.$$

Accordingly, in this illustrative example, soil porosity is calculated as:

$$n = 1 - \frac{D_b}{D_p} = 1 - \frac{1.52}{2.27} = 0.33.$$

Some implementations may include a control interface (e.g., touch screen control panel) to allow the user to start and stop the process, and even to store previous measurements for comparison. This interface will incorporate an integrated circuit that has a microcontroller system that will govern the calculation of porosity and display the results digitally. The microcontroller will consist of processor to carry out the mathematical calculations, a program memory and a RAM unit for saving the results if needed. The input to this system will be the weight of the soil, the weight of the particles in the soil and it will have a fixed input of the volume of the soil and the volume of the water based on the containers dimension and the density of water at the test temperature.

Figure 3:
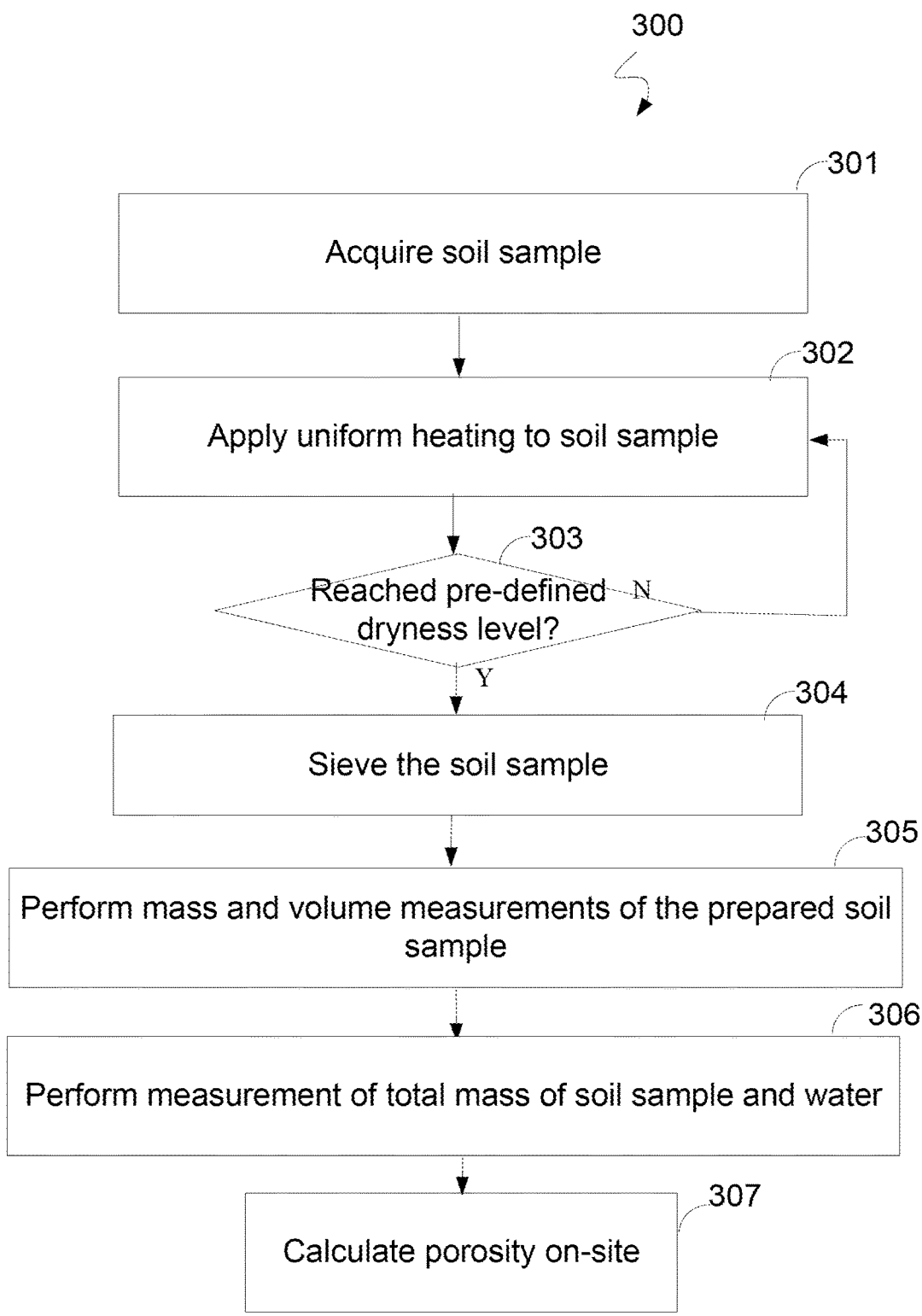
FIG. 3 is a flow chart illustrating an example according to some implementations of the present disclosure.

FIG. 3 is a flow chart 300 illustrating an example of a process according to some implementations of the present disclosure. The process may acquire soil sample onsite (301). As explained above, the sample collection may accommodate measurements of soil porosity including the minimum porosity and the effective porosity. For example, the implementations may acquire soil sample using a tool (e.g., a cylindrical tool) with a known volume. The fixed-volume tool can be filled with soil flush with the top level of the tool. When effective porosity is sought, the sampling tool can have a transparent window to allow for visual inspection of the soil without disturbance. When minimum porosity is sought, the soil sample can be compacted inside the sampling tool so that additional soil can be further filled inside.

The process may then apply uniform heating to the soil sample (302). As explained above in association with FIGS. 1-2, the acquired sample can be placed on a perforated or mesh platform located in the center of the sampling compartment to achieve uniform heating (on all sides) using, for example, microwave heating. The heating chamber may be a cylindrical design lined with a material resistant to microwaves, such as ceramics, for safety and durability. The microwave power and drying time could be adjustable to accommodate different soil types and moisture content. For example, the microwave power and drying time can be adjusted based on measurements from a built-in moisture sensor integrated into the heating chamber. For example, the process can compare the measured moisture level with a predetermined threshold (303). In response to determining that the measured moisture level has reached the predetermined threshold, the process may automatically stop the drying process move on to, e.g., sieve the dried sample (304). In response to determining that the measured moisture level has not reached the predetermined threshold, the process may continue heating (302). Using the feedback based on actual moisture measurement, the implementations can enforce, e.g., consistency across different soil samples.

In some implementations seeking measurements of minimum porosity, the process may sieve the soil sample (304). As explained above, the soil sample can be sieved through a mesh, which can have a size of 4.75 mm consistent with the ASTM D854-14 laboratory standard for soil porosity measurement. Once the soil sample is ready in the container, also known as a water pycnometer used to measure the density or specific gravity of the soil sample, the implementations may perform mass and volume measurements of the prepared sample (305). Some containers can incorporate a digital precision scale with sufficient accuracy (e.g., 0.01 g or better) and in communication with the control interface to record weight measurement. The scale may be embedded in a flat platform designed to hold the container for weighing (e.g., scale 205 as illustrated in FIG. 2). The container can have a fixed volume soil and filled with soil sample, and placed on the scale of compartment so that the mass of the soil sample ($W_s$) may be measured for the fixed volume.

The implementations may then perform measurements of total mass of soil sample and water (306). For example, the pycnometer can be filled with distilled water to a specified level and then thoroughly mixed with the prepared soil sample for measuring total mass of soil sample and water. As explained above, a separate container, larger than the container used in step 305, can be used. The separate container can be larger than the earlier container by at least 20% in volume. The separate container can be filled by water to a mark of, e.g., 40% of the total volume. Soil can then be added slowly to the water until all soil specimen is added. During this process, if needed, more water can be added to saturate the soil before continuing to add soil so as to stop the soil from clustering, which may mislead the porosity calculation. After water addition, the total mass of the water and soil ($W_{SW}$) can also be measured using the embedded scale. In some cases, the mass of water filled to the same mark can a predetermined value ($W_W$) and is recorded in the system for use in the porosity calculation. The process may then calculate soil porosity (307) based on the measured mass and volume using, for example, equation (4), as outlined above in association with FIGS. 1-2.

Understanding soil porosity, which influences the availability of water and oxygen in the soil, can be pivotal in various industries. This parameter can significantly affect the electrochemical reactions driving corrosion, thereby warranting accurate, reliable, and convenient soil porosity measurements. Yet, existing methods for such measurements are hindered by limitations.

For example, neutron scattering, a common method for estimating soil porosity, relies on the use of radioactive sources, introducing safety and regulatory considerations that may not be suitable in all contexts. Computed Tomography (CT) scanning, while offering high-resolution, three-dimensional images of soil structure, is hindered by high costs and the need for bulky equipment and substantial data processing, which may not be feasible or economical for many applications. Time Domain Reflectometry (TDR) probes may offer in-situ measurements, a significant advantage in certain applications. However, this method often provides less accurate results in soils with high salinity or high clay content. Nuclear radiation methods, although technologically advanced, share the safety, regulatory, and cost issues present in neutron scattering. Other conventional methods, such as gas pycnometry and mercury intrusion porosimetry, also have shortcomings and deficiencies. These techniques are often unsuitable for field application because these techniques may disrupt the soil structure. In particular, mercury intrusion porosimetry is a destructive method and therefore may not be applicable in certain situations. Additionally, ground penetrating radar (GPR) has been used to determine compactness the soil is on a large scale, which can be used to estimate the porosity of the soil. However, the complications involved in analyzing the results of GPR represents a major limitation of this methodology. Porosity is also not calculated here according to the standardized methodology as exemplified by, e.g., ASTM D854-14, because the GPR only estimates the percentage where air-gaps are present, i.e. porosity. Moreover, the prevalent ASTM D854-14 laboratory procedure, which, despite its robustness and wide acceptance, is poorly suited for field measurements.

Implementations of the present disclosure can address the shortcomings using a novel solution for soil porosity measurement by providing a portable device that can measure soil porosity in-situ based on the widely accepted ASTM methodology. No high costs are associated with the portable device, which generally includes a power source for the microwave heater and the scale power. No safety hazards are associated with the operation of the portable device. Indeed, the implementations provide a versatile, portable, and reliable tool for measuring soil porosity, particularly in field applications, that is not met by existing methodologies. Significantly, the implementations provide the ability to conduct calculations in-situ without the need for laboratory intervention.

Figure 4:
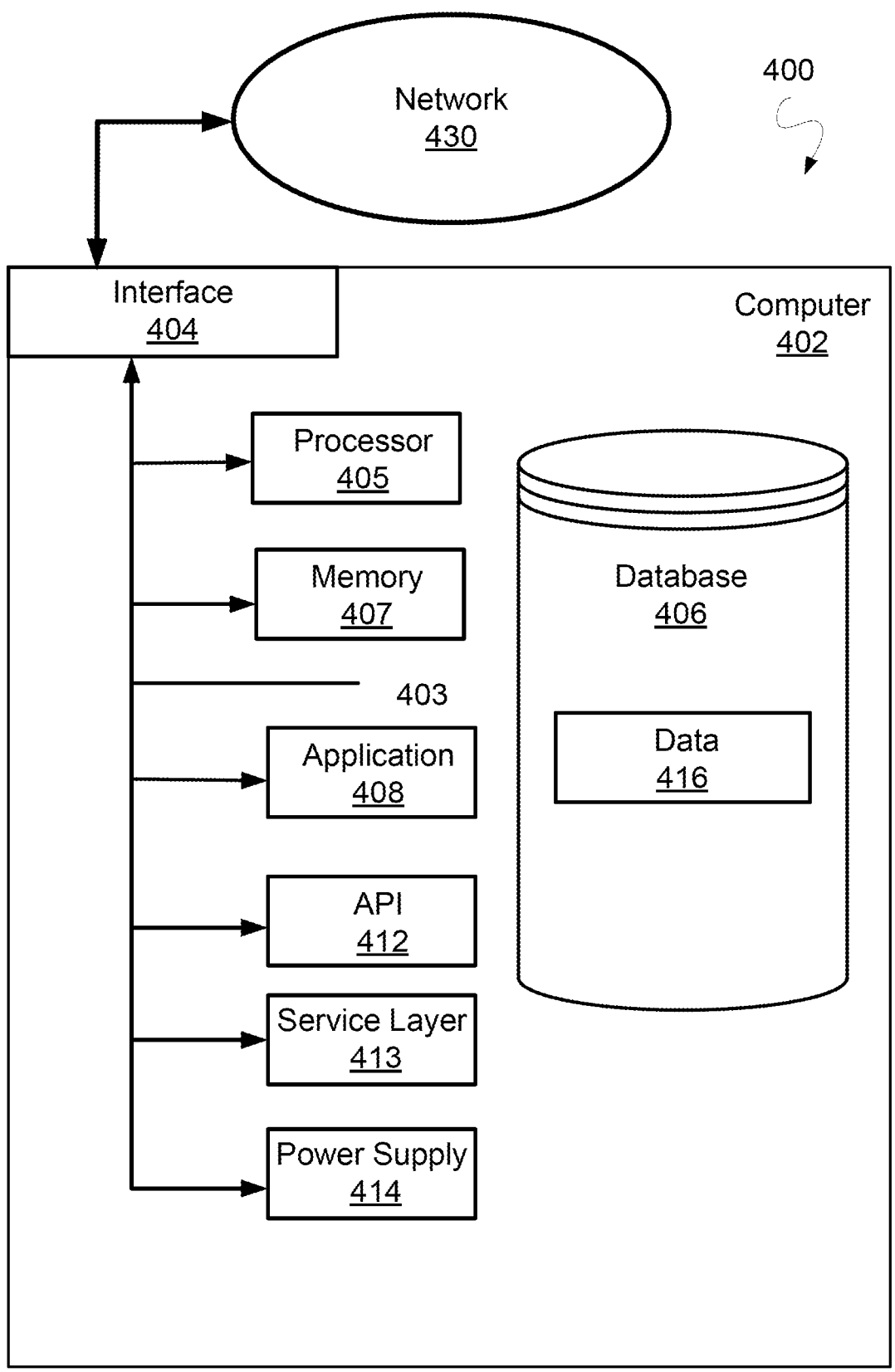
FIG. 4 is a block diagram illustrating an example of a computer system used to provide computational functionalities associated with described algorithms, methods, functions, processes, flows, and procedures, according to an implementation of the present disclosure.

FIG. 4 is a block diagram 400 illustrating an example of a computer system 400 used to provide computational functionalities associated with described algorithms, methods, functions, processes, flows, and procedures, according to an implementation of the present disclosure. The illustrated computer 402 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 402 can comprise a computing device that includes an input device, such as a keypad, keyboard, touch screen, another input device, or a combination of input devices that can accept user information, and an output device that conveys information associated with the operation of the computer 402, including digital data, visual, audio, another type of information, or a combination of types of information, on a graphical-type user interface (UI) (or GUI) or other UI.

The computer 402 can serve in a role in a computer system as a client, network component, a server, a database or another persistency, another role, or a combination of roles for performing the subject matter described in the present disclosure. The illustrated computer 402 is communicably coupled with a network 430. In some implementations, one or more components of the computer 402 can be configured to operate within an environment, including cloud-computing-based, local, global, another environment, or a combination of environments.

The computer 402 is an electronic computing device operable to receive, transmit, process, store, or manage data and information associated with the described subject matter. According to some implementations, the computer 402 can also include or be communicably coupled with a server, including an application server, e-mail server, web server, caching server, streaming data server, another server, or a combination of servers.

The computer 402 can receive requests over network 430 (for example, from a client software application executing on another computer 402) and respond to the received requests by processing the received requests using a software application or a combination of software applications. In addition, requests can also be sent to the computer 402 from internal users, external or third-parties, or other entities, individuals, systems, or computers.

Each of the components of the computer 402 can communicate using a system bus 403. In some implementations, any or all of the components of the computer 402, including hardware, software, or a combination of hardware and software, can interface over the system bus 403 using an application programming interface (API) 412, a service layer 413, or a combination of the API 412 and service layer 413. The API 412 can include specifications for routines, data structures, and object classes. The API 412 can be either computer-language independent or dependent and refer to a complete interface, a single function, or even a set of APIs. The service layer 413 provides software services to the computer 402 or other components (whether illustrated or not) that are communicably coupled to the computer 402. The functionality of the computer 402 can be accessible for all service consumers using this service layer. Software services, such as those provided by the service layer 413, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 402, alternative implementations can illustrate the API 412 or the service layer 413 as stand-alone components in relation to other components of the computer 402 or other components (whether illustrated or not) that are communicably coupled to the computer 402. Moreover, any or all parts of the API 412 or the service layer 413 can be implemented as a child or a sub-module of another software module, enterprise application, or hardware module without departing from the scope of the present disclosure.

The computer 402 includes an interface 404. Although illustrated as a single interface 404 in FIG. 4, two or more interfaces 404 can be used according to particular needs, desires, or particular implementations of the computer 402. The interface 404 is used by the computer 402 for communicating with another computing system (whether illustrated or not) that is communicatively linked to the network 430 in a distributed environment. Generally, the interface 404 is operable to communicate with the network 430 and comprises logic encoded in software, hardware, or a combination of software and hardware. More specifically, the interface 404 can comprise software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors can be used according to particular needs, desires, or particular implementations of the computer 402. Generally, the processor 405 executes instructions and manipulates data to perform the operations of the computer 402 and any algorithms, methods, functions, processes, flows, and procedures as described in the present disclosure.

The computer 402 also includes a database 406 that can hold data for the computer 402, another component communicatively linked to the network 430 (whether illustrated or not), or a combination of the computer 402 and another component. For example, database 406 can be an in-memory, conventional, or another type of database storing data consistent with the present disclosure. In some implementations, database 406 can be a combination of two or more different database types (for example, a hybrid in-memory and conventional database) according to particular needs, desires, or particular implementations of the computer 402 and the described functionality. Although illustrated as a single database 406 in FIG. 4, two or more databases of similar or differing types can be used according to particular needs, desires, or particular implementations of the computer 402 and the described functionality. While database 406 is illustrated as an integral component of the computer 402, in alternative implementations, database 406 can be external to the computer 402. As illustrated, the database 406 holds data 416 including, for example, data encoding the mass and volume values, as explained in more detail in association with FIGS. 1-3.

The computer 402 also includes a memory 407 that can hold data for the computer 402, another component or components communicatively linked to the network 430 (whether illustrated or not), or a combination of the computer 402 and another component. Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 or similar or differing types can be used according to particular needs, desires, or particular implementations of the computer 402 and the described functionality. While memory 407 is illustrated as an integral component of the computer 402, in alternative implementations, memory 407 can be external to the computer 402.

The application 408 is an algorithmic software engine providing functionality according to particular needs, desires, or particular implementations of the computer 402, particularly with respect to functionality described in the present disclosure. For example, application 408 can serve as one or more components, modules, or applications. Further, although illustrated as a single application 408, the application 408 can be implemented as multiple applications 408 on the computer 402. In addition, although illustrated as integral to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion or management circuits (including recharging, standby, or another power management functionality). In some implementations, the power-supply 414 can include a power plug to allow the computer 402 to be plugged into a wall socket or another power source to, for example, power the computer 402 or recharge a rechargeable battery.

There can be any number of computers 402 associated with, or external to, a computer system containing computer 402, each computer 402 communicating over network 430. Further, the term "client," "user," or other appropriate terminology can be used interchangeably, as appropriate, without departing from the scope of the present disclosure. Moreover, the present disclosure contemplates that many users can use one computer 402, or that one user can use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/−R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-assisted method to monitor soil porosity at a field study site using a portable apparatus, the method comprising:
    acquiring, at the field study site, a soil sample using a first container of the portable apparatus;
    automatically recording a first measurement of a mass and a volume of the soil sample acquired by the first container;
    gradually adding the soil sample to a second container that is larger than the first container in volume until the soil sample is added in entirety, wherein the second container is pre-filled with a fluid medium to a pre-determined level, wherein the soil sample is added to the second container without causing soil clustering, and wherein a second measurement of a mass of the second container with the fluid medium pre-filled to the pre-determined level is automatically recorded;
    automatically recording a third measurement of a mass of the second container with the soil sample fully immersed in the fluid medium;
    automatically calculating a porosity of the soil sample based on the first measurement, the second measurement, and the third measurement; and
    automatically providing, on a display of the portable apparatus and at the field study site, the calculated porosity of the soil sample.

2. The method of claim 1, further comprising:
drying, using a microwave, the soil sample inside the first container until the soil sample reaches a pre-defined dryness level; and
monitoring, using a build-in moisture sensor on the portable apparatus, a moisture level of the soil sample inside the first container.

3. The method of claim 2, further comprising:
comparing the moisture level of the soil sample inside the first container with the pre-defined dryness level; and
responsive to the moisture level of the soil sample reaching the pre-defined dryness level, stopping the microwave.

4. The method of claim 2, further comprising:
sieving the soil sample through a mesh with a pre-determined mesh size.

5. The method of claim 4, wherein:
the pre-determined mesh size complies with an industry standard for laboratory testing.

6. The method of claim 2, wherein the pre-defined dryness level is provided by a user on an interactive user interface.

7. The method of claim 1, wherein the first measurement of the mass of the soil sample acquired by the first container is performed using a digital scale.

8. The method of claim 1, wherein the third measurement of the mass of the second container with the soil sample fully immersed in the fluid medium is performed using a digital scale.

9. The method of claim 1, wherein the porosity is calculated using a microprocessor configured to receive the first measurement, the second measurement, and the third measurement.

10. The method of claim 1, wherein the calculated porosity is provided on a recurring basis at the field study site using the portable apparatus such that soil porosity at the field study site is monitored according to the recurring basis.

11. A portable apparatus for monitoring soil porosity at a field study site, the portable apparatus comprising:
a first container sized and shaped to acquire, at the field study site, a soil sample;
a second container sized to have a volume larger than the first container and operable to be pre-filled with a fluid medium to a pre-determined level such that the soil sample can be gradually added to the second container without causing soil clustering;
a digital recording device coupled to the first and second containers and configured to automatically record a first measurement of a mass and a volume of the soil sample, a second measurement of a mass of the second container with the fluid medium pre-filled to the pre-determined level, and a third measurement of a mass of the second container with the soil sample fully immersed in the fluid medium;
a control logic coupled to the digital recording device, wherein the control logic is configured to perform operations of:
receiving recordings from the digital recording device;
automatically calculating a porosity of the soil sample based on the first measurement, the second measurement, and the third measurement; and
automatically providing, at the field study site, the porosity of the soil sample; and
a display coupled to the control logic and configured to display the calculated porosity of the soil sample.

12. The portable apparatus of claim 11, further comprising:
a microwave device compatible with the first container and configured to dry the soil sample inside the first container until the soil sample reaches a pre-defined dryness level; and
a build-in moisture sensor operable to be immersed in the soil sample and configured to measure a moisture level of the soil sample inside the first container while the soil sample is being dried.

13. The portable apparatus of claim 12, wherein the control logic is configured to perform additional operations of:
comparing the moisture level of the soil sample inside the first container with the pre-defined dryness level; and
responsive to the moisture level of the soil sample reaching the pre-defined dryness level, stopping the microwave device.

14. The portable apparatus of claim 12, further comprising:
a mesh with a pre-determined mesh size such that the soil sample can be sieved.

15. The portable apparatus of claim 14, wherein:
the pre-determined mesh size complies with an industry standard for laboratory testing.

16. The portable apparatus of claim 12, further comprising an interactive user interface configured to allow a user to enter the pre-defined dryness level, and wherein the interactive user interface comprises the display where the porosity is displayed.

17. The portable apparatus of claim 11, wherein the digital recording device comprises a digital scale configured to perform the first measurement of the mass of the soil sample acquired by the first container.

18. The portable apparatus of claim 11, wherein the digital recording device comprises a digital scale configured to perform the third measurement of the mass of the second container with the soil sample fully immersed in the fluid medium.

19. The portable apparatus of claim 11, wherein control logic comprises a microprocessor configured to receive the first measurement, the second measurement, and the third measurement, and calculate the porosity based on the first measurement, the second measurement, and the third measurement.

20. The portable apparatus of claim 11, wherein the portable apparatus is configured to provide the calculated porosity on a recurring basis at the field study site such that soil porosity at the field study site is monitored according to the recurring basis.

* * * * *